United States Patent

[11] 3,561,701

| [72] | Inventor | Wilbert A. Kalk<br>416 S. Susana Ave., Redondo Beach, Calif. 90277 |
|---|---|---|
| [21] | Appl. No. | 804,391 |
| [22] | Filed | Mar. 5, 1969 |
| [45] | Patented | Feb. 9, 1971 |

[54] VERTICAL TAKEOFF AND LANDING AIRCRAFT
2 Claims, 4 Drawing Figs.

[52] U.S. Cl. .................................................. 244/12, 244/15
[51] Int. Cl. ..................................................... B64c 29/00
[50] Field of Search .......................................... 244/12, 15, 23; 230/(Inquired); 415/(Inquired)

[56] References Cited
UNITED STATES PATENTS

| 1,787,495 | 1/1931 | Schlam | 244/12 |
| 3,041,010 | 6/1962 | Foster | 244/12C |
| 3,067,967 | 12/1962 | Barr | 244/12C |
| 3,179,353 | 4/1965 | Peterson | 244/12B |

*Primary Examiner*—Milton Buchler
*Assistant Examiner*—Steven W. Weinrieb
*Attorney*—Richard K. Macneill ABSTRACT: A vertical takeoff and landing aircraft which consists of a high wing monoplane having the wing mounted on top of the fuselage cabin section with first and second fan wells in the top of the wing in which are mounted first and second fans, respectively; first and second ducts disposed beneath the first and second fans and communicating with exhaust ports below the bottom of the wing; the ducts being formed by a plurality of pie-shaped segments which are rotatably mounted on a radial axis in the fan well for being rotated to a vertical position which will create straight cylindrical ducts and allow the fans to propel the vertical takeoff and landing aircraft in a vertical direction and when closed, form helical ducts for exhausting in a rearward direction under the wing for a forward propulsion of the vertical takeoff and landing aircraft.

PATENTED FEB 9 1971  3,561,701

INVENTOR.
WILBERT A. KALK
BY
Richard K. MacNeill

INVENTOR.
WILBERT A. KALK
BY
Richard K. Macneill

VERTICAL TAKEOFF AND LANDING AIRCRAFT

BRIEF DESCRIPTION OF THE INVENTION

The present invention relates to a vertical takeoff and landing aircraft and more particularly to a vertical takeoff and landing aircraft which has fans in a wing mounted with a vertical axis of rotation and adjustable ducts disposed beneath the fans for adjustably directing the thrust of the fans.

According to the invention, a vertical takeoff and landing aircraft is provided having at least one wing with a fan well therein and a fan mounted in the fan well for lending a vertical thrust to the aircraft, i.e., the fan is mounted with substantially vertical axis of rotation within the well. An adjustable duct is disposed within the well beneath the fan which consists of a plurality of pie-shaped segments which, when open, will direct the thrust downward from the fan and, when closed, will form a helical duct exhausting to the rear of the airplane for creating a forward thrust from the fan. The pie-shaped segments are rotatably mounted and preferably have individual driving units. Hence, when it is desired to lift the aircraft, the segments will be rotated to a vertical position directing the thrust downward, and when it is desired to move the aircraft in level flight, the segments will be closed creating a rearward thrust through a helical duct.

An object of the present invention is the provision of a vertical takeoff and landing aircraft having a substantially conventional wing for more efficient operation in horizontal flight.

Another object of the present invention is the provision of a vertical takeoff and landing aircraft which has a relatively long glide range in the event of a power failure.

Yet another object of the invention is the provision of a vertical takeoff and landing aircraft in which the direction of thrust from the fan is variable.

A further object of the invention is the provision of a vertical takeoff and landing aircraft having fan duct geometry with optimum efficiency.

A still further object of the present invention is the provision of a vertical takeoff and landing aircraft which is inexpensive to manufacture, simple to operate, and extremely reliable.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein.

DETAILED DESCRIPTION OF THE DRAWINGS

Figure 1:
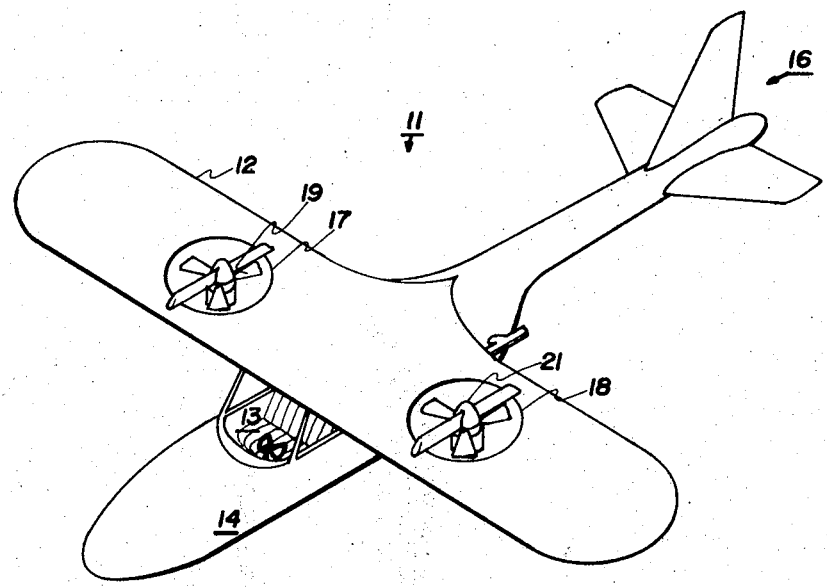
FIG. 1 is a perspective view of a vertical takeoff and landing aircraft utilizing the present invention.

Referring to FIG. 1, a vertical takeoff and landing aircraft is shown generally at 11 having a wing 12 over a cabin section 13 of fuselage 14. Fuselage 14 has a tail section 16. Wing 12 has a pair of fan wells 17 and 18 with fans 19 and 21, respectively, mounted therein with their axis of rotation generally vertical.

Figure 2:
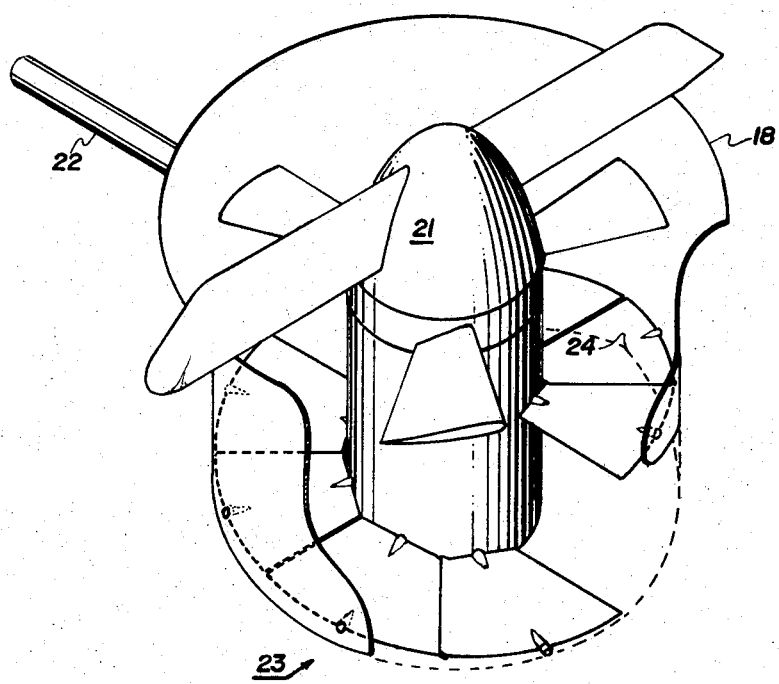
FIG. 2 is a perspective view of the fan and ducting mechanism of the present invention.

Referring to FIG. 2, fan 21 is shown mounted in well 18. Drive shaft 22 is coupled (not shown) to drive fan 19. A duct generally shown at 23 directs air from fan 21 in a downward helical direction to exhaust port 24.

Figure 3:
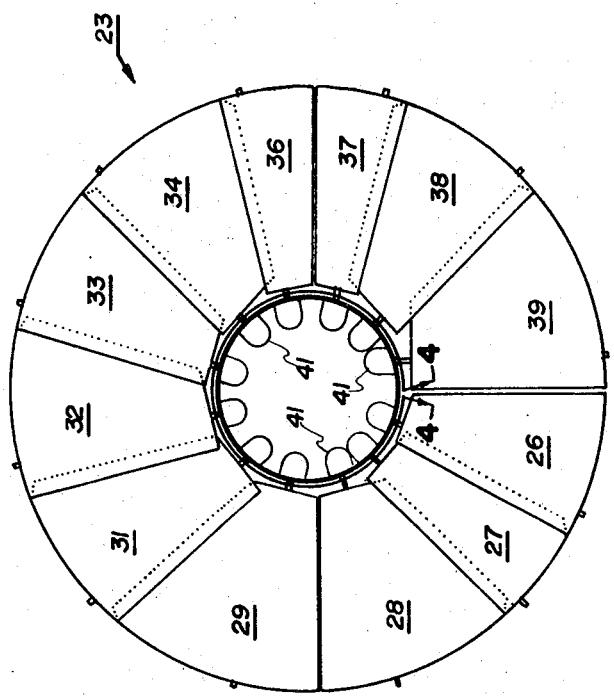
FIG. 3 is a top view of the duct segments of the present invention in a closed position.

Referring to FIG. 3, duct 23 is shown having pie-shaped segments 26, 27, 28, 29, 31, 32, 33, 34, 36, 37, 38 and 39, making up the duct. Each segment is rotatably mounted within the well and is driven by a plurality of separate drive means 41 into various relative positions. The dotted lines indicate the overlap of each pie-shaped section.

Figure 4:
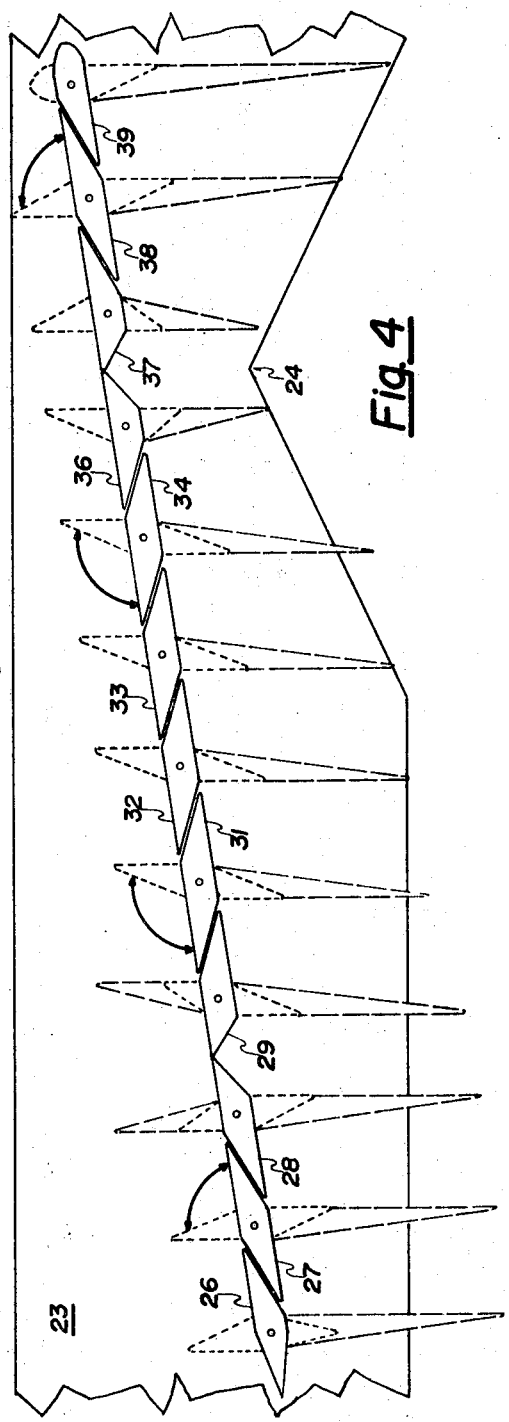
FIG. 4 is a schematic representation of the variable thrust mechanism of the present invention.

Referring to FIG. 4, a linear representation of sections 26 through 39 is shown with the closed position indicated by solid lines and within well 23 if it were linearized with the port being centered at 24. The dotted lines indicate the vertical position of ducts 26 through 39, while the short dotted sections indicate the inner edge of the pie-shaped sections in this position. The arrows indicate the quadrant of rotation of the various segments, the axis of rotation being indicated by the dots in each segment.

OPERATION

Referring back to FIG. 1, it can be seen that with fans 19 and 21 in operation, a downward thrust will be presented to ports 17 and 18 and wing 12 which will, if allowed to flow through ports 17 and 18, exert a vertical upward thrust on vertical takeoff and landing aircraft 11.

Referring back to FIG. 2, it can be seen that helical ducting having an exhaust at 24, will direct the thrust from fan 21 and port 18, in a generally rearward and slightly downward direction resulting in a thrust in a generally forward direction.

As shown in FIGS. 3 and 4, the pie-shaped segments 26 through 39 can be closed in an overlapping position which will result in a helical duct being formed for horizontal thrust, i.e., forward thrust or, in the alternative, as shown by dotted lines in FIG. 4, they can be rotated to a vertical position which will open port 23 resulting in an upward thrust from the fan. Hence, in operation, for vertical takeoffs and landings, the pie-shaped segments will be in a position shown at dotted lines in FIG. 4 resulting in an upward thrust from the fans for hovering. For forward flight, they will be rotated to the overlapping position shown in FIG. 3 and in FIG. 4 in solid lines which will form a helical duct resulting in a forward thrust for horizontal movement. For actual vertical flight, the segments will be rotated to an intermediate position which will present a minimum resistance to the air stream from the fan for maximum efficiency. It can also be seen that the construction disclosed results in a vertical takeoff and landing aircraft with extremely high stability due to a substantially conventional wing, i.e., the aircraft will depend upon extensive wing lift, as well as fan thrust.

It is to be understood that alternate constructions are contemplated, such as having a single fan embodiment with a split fuselage and low and midwing implementations as specifications dictate. While a conventional tail assembly is shown, this does not form a part of the present invention and any suitable assembly could be utilized.

I claim:

1. A vertical takeoff and landing aircraft comprising:
a fuselage section having at least one wing attached thereto;
at least one fan well in said at least one wing;
a power driven fan mounted in said at least one fan well having a substantially vertical axis of rotation; and
adjustable ducting means for adjustably directing thrust from said fan between a generally upward direction and a generally forward direction, said adjustable ducting means having a helical ducting path with a rearward exhaust in one extreme position and a vertical cylindrical duct in another extreme position.

2. The vertical takeoff and landing aircraft of claim 1 wherein said adjustable ducting means comprises a plurality of pie-shaped sections, said pie-shaped sections overlapping to form a helical duct in said one extreme position and being rotatable to form vertical parallel planes in said another extreme position.